United States Patent
Nickel

(10) Patent No.: US 6,359,414 B1
(45) Date of Patent: Mar. 19, 2002

(54) METHOD FOR CONTROLLING A RELUCTANCE MOTOR

(75) Inventor: Armin Nickel, Esslingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/744,164

(22) PCT Filed: Jun. 24, 1999

(86) PCT No.: PCT/EP99/04406

§ 371 Date: Apr. 4, 2001

§ 102(e) Date: Apr. 4, 2001

(87) PCT Pub. No.: WO00/05095

PCT Pub. Date: Feb. 3, 2000

(30) Foreign Application Priority Data

Jul. 22, 1998 (DE) .......................................... 198 32 876

(51) Int. Cl.$^7$ ................................................. H02P 7/36
(52) U.S. Cl. ........................ 318/701; 318/254; 318/138; 318/439
(58) Field of Search ................................. 318/701, 254, 318/439, 138, 607, 799

(56) References Cited

U.S. PATENT DOCUMENTS

| | | | | |
|---|---|---|---|---|
| 6,011,377 A | * | 1/2000 | Heglund et al. | 318/701 |
| 6,040,678 A | * | 3/2000 | Huh et al. | 318/701 |
| 6,288,514 B1 | * | 9/2001 | Direnzo et al. | 318/701 |

OTHER PUBLICATIONS

Bausch et al., "Torque Control of Battery–Supplied Switched Reluctance Drives for Electric Vehicles", ICEM (1996) pp. 229–234 (XP–002118560).

Bausch et al., "Performance Characteristics of an Europed–Medium SRD for Electric Vehicles", Symposium on Power Electronics, Electrical Drives, Advanced Machines, Power Quality, Jun., 1998, pp. B2–1 to B2–6 (XP–0021185761).

* cited by examiner

*Primary Examiner*—Karen Masih
(74) *Attorney, Agent, or Firm*—Crowell & Moring LLP

(57) ABSTRACT

A method for controlling a reluctance machine, particularly a switched reluctance machine by use of a torque controller, in which motor windings are switched on as a function of the rotor angular position ($\gamma_{EL}$) at a switch-on angle ($\gamma_A$) and are switched off at a commutation angle ($\gamma_K$), with the angles being determined as control parameters ($i_W$, $\gamma_A$, $\gamma_K$), as a function of the rotation speed (n) from stored control coefficients ($\gamma_O, c_A, m_W^{mA}, c_K, c_{AG}, c_{KG}, M_W^{mAG}, p, q$) which are read during operation of the reluctance motor, with the commutation angle ($\gamma_K$) for each rotation speed (n) at least remaing constant or increasing, starting from a maximum value $c_1$ at a maximum totque ($M_{W,max}$), as the torque values ($M_W$) decrease, and , subsequently, with a winding current preset nominal value ($i_W$), which is claculated as a control parameter, for the windings (A, B, C) of the reluctance motor being sent to a current regulation device.

14 Claims, 5 Drawing Sheets

METHOD FOR CONTROLLING A RELUCTANCE MOTOR

Figure 1:
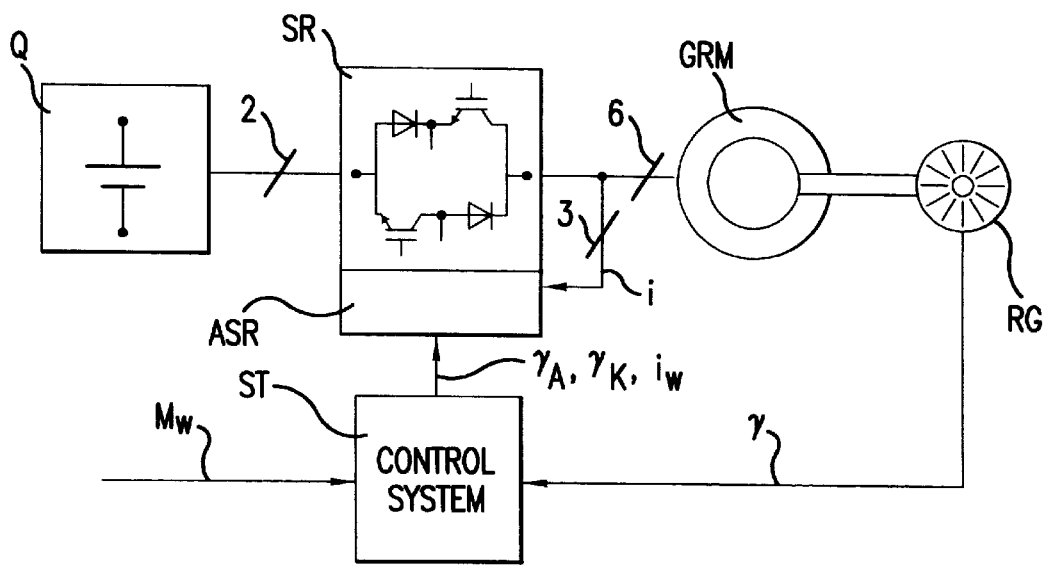

The invention relates to a method for controlling a reluctance machine, in particular a switched reluctance machine.

Conventional drive systems, in particular for electrical vehicles, are frequently operated in a torque-regulated mode. However, it is advantageous to be able to operate such a drive system as an accelerator pedal controlled torque source, with a linear relationship between the control variable and the output variable being desirable.

In known, conventional drive systems, this requirement can be achieved by controlling the magnetic flux and/or the current. One precondition for this is that the flux and current are independent of one another, and can be influenced separately from one another.

This precondition is not satisfied in the case of reluctance machines since, owing to the single-sided excitation, the flux and current are fundamentally coupled to one another. A further exacerbating factor is that the coupling between the flux and current is generally not linear. No clear electrical signal is known from the prior art from which it would be possible to derive an instantaneous or average torque with sufficient accuracy.

The torque depends on the current waveform and its position with respect to the rotor rotation angle which, for its part, is influenced by being sensitive to the switching angles. Admittedly, values for the switch-on and commutation angles can be obtained from empirically obtained information about the switching angles, and these values are preferably stored in a memory and are available during operation. Although this allows a proportionality to be established between the nominal value and the actual value of the torque, it is not possible to establish a linear relationship. For this reason, rotation-speed-regulated reluctance drive systems can admittedly be produced. However, at the moment, there are few indications of production of a sufficiently accurate torque-regulated reluctance drive system.

Reluctance machines are particularly suitable for traction drive systems, in addition to conventional electrical machines, since they do not produce any electrical heat in the rotor and water cooling can be implemented in the stator allowing good utilization since, owing to the intrinsic characteristics of the magnetic circuit, they allow high torques even at low rotation speeds. Furthermore, they have very good partial-load efficiencies in the lower rotation-speed range.

The simple design of the machine leads to production advantages over conventional machines. The rotor has a small rotating mass, and the converter circuit has inherent resistance to short circuits.

The dissertation by A. Nickel at the Faculty of Electrical Engineering at the German Federal Armed Forces University, Munich, May 1998 has already proposed a torque-controlled, switched reluctance machine, in which a highly loaded machine is modelled and in which the simulation parameters obtained from this allow the winding currents, and the winding torque profiles which are dependent on them, to be calculated in advance with sufficient accuracy both during pulsed operation and during block operation. From this, the control parameters can be optimized for a low electrical heat level as a function of the mean value of the internal torque of the m windings, and can be calculated iteratively for the entire operation range.

The position of the switching angles in the torque nominal value rotor rotation angle plane is approximated by using parabolic functions, and that of the nominal current values is approximated by using root functions. The control coefficients obtained in this way are used for real-time calculation of the control parameters during operation. The switching angles calculated in this way are output to a converter, and the nominal current value is output to an analogue current regulation device with a two-point regulator.

In this case, during motor and generator operation, alternating clocking of the voltage is used in each case in pulsed operation. All three control parameters, the switch-on angle, the commutation angle and the winding nominal current value, are required in this case. In block operation, the control system primarily uses the two switching angles during motor operation. The nominal current value is used as a control variable only in the event of an overvoltage, in order to prevent the winding current from rising in an uncontrolled manner. During generator operation on the other hand, the control system operates with the switch-on angle and the nominal current value in block operation, and the commutation angle becomes less important.

The object of the invention is to improve a method for controlling a switched reluctance motor of the type described above.

This object is achieved by the features of the independent claim. Further advantages and refinements of the invention are evident from the other claims and from the description.

According to the invention, the commutation angle for each rotation speed is selected such that it at least remains constant, or increases, starting from a maximum value at a maximum torque, as the torque values decrease. A winding current preset nominal value for the windings of the reluctance motor is then sent as a control parameter to a current regulation device. The particular advantage is that, to obtain the commutation angle at a given rotation speed, it is either possible just to use a constant which is independent of the torque, rather than having to read its torque-dependent values from tables which consume memory space and commutation time, or else it is possible to use the already known or calculated path of the switch-on parabola. Nevertheless, the motor torque utilization is good.

It is advantageous that, at least in motor operation, the commutation angle at least remains constant or increases, starting from a maximum value with a maximum torque, as the torque values decrease. It is also advantageous, both in generator operation and in motor operation, to select the commutation angle for each rotation speed to be at least constant or increasing, starting from a maximum value at a maximum torque, as the torque values decrease.

The advantage with both measures is that both memory space and computation time can be saved in the control system. This makes it possible to calculate the control parameters in real time with sufficient accuracy and with a small angular error.

A further preferred embodiment of the invention is to use a constant commutation angle, which is independent of the nominal torque value, for each rotation speed. If the torque utilization is good, computation time and memory space are saved in a control system. It is particularly preferable, for a given rotation speed, to select the maximum commutation angle at the maximum torque to be constant.

A further preferred embodiment of the invention is to form the commutation angle using the relationship $\gamma_K(n) = c_1 + \gamma_A(n)$, where $\gamma_A(n)$ is the path of the switch-on parabola as a function of the torque. It is particularly advantageous in this case that no additional computation complexity is required even though a torque-dependent variable is now being used for the commutation angle, since the switch-on parabola path has already been calculated. The torque utilization of the motor is further improved by the greater commutation angles at low torques.

It is advantageous to monitor for a maximum commutation angle, and in particular this reliably prevents a maximum commutation angle of more than 370°. Monitoring of the commutation angle is preferably implemented in machine control software.

Figure 2:
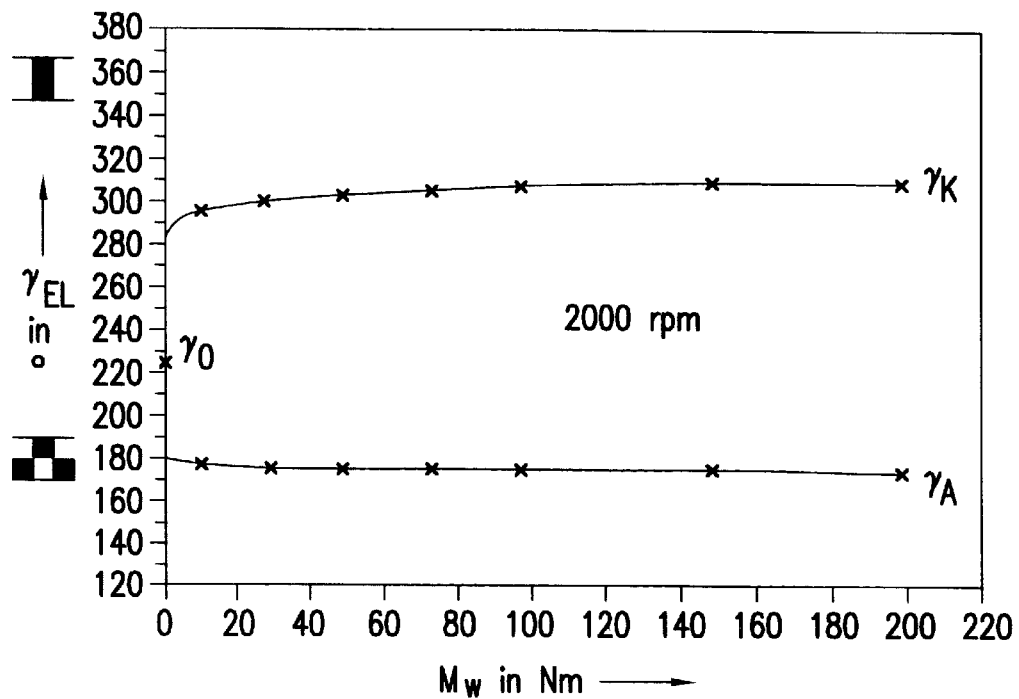
Figure 3:
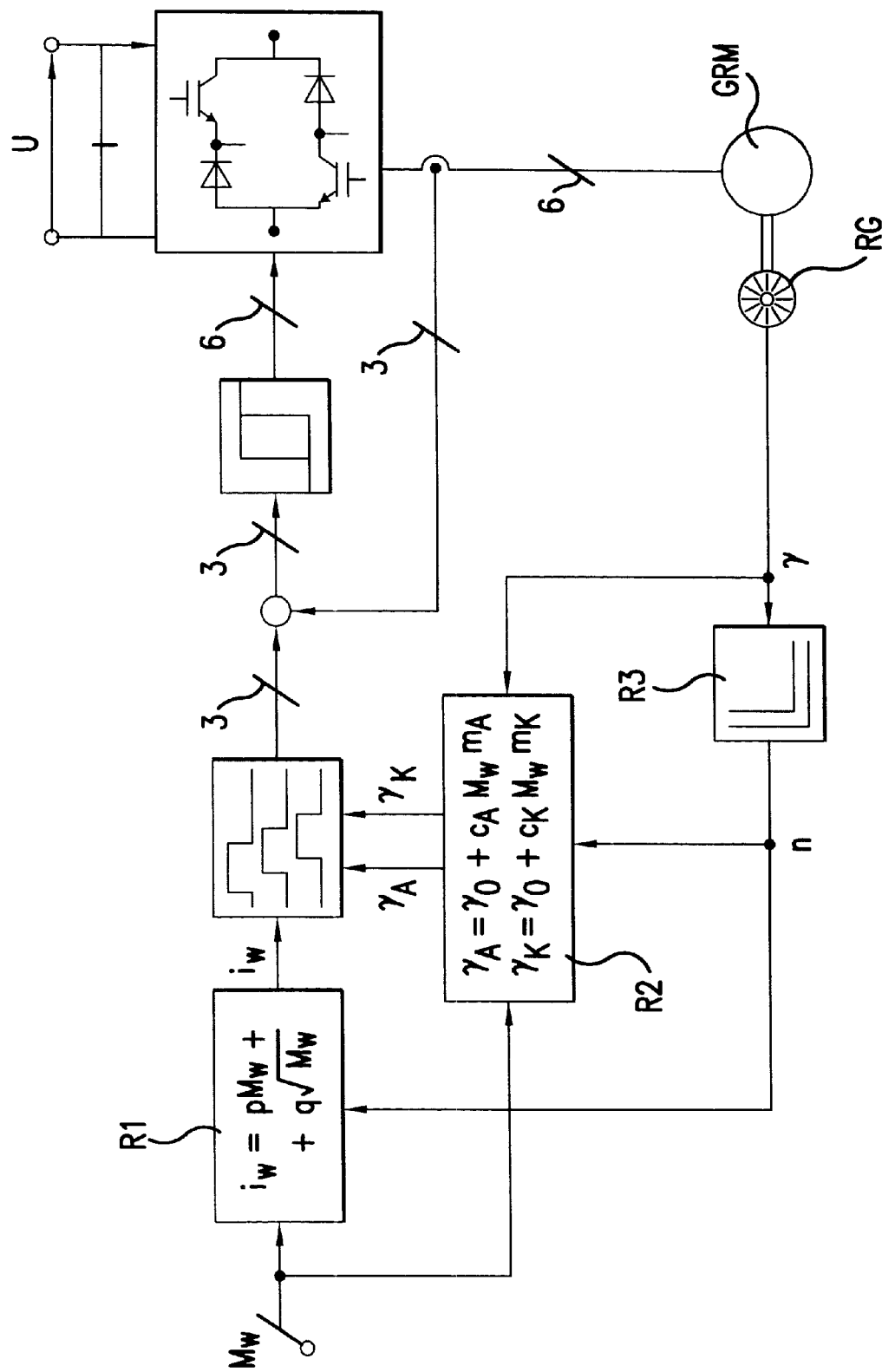
Figure 4:
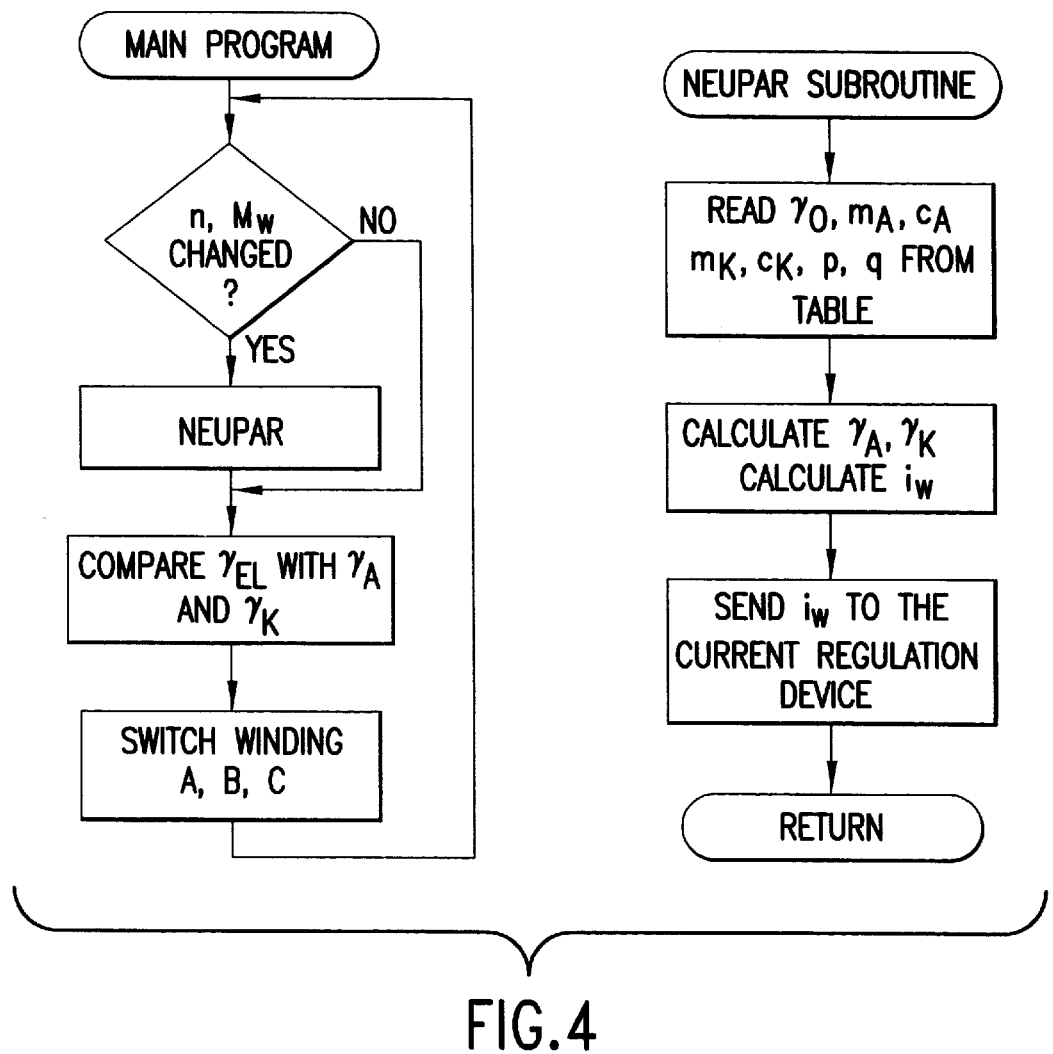
Figure 5:
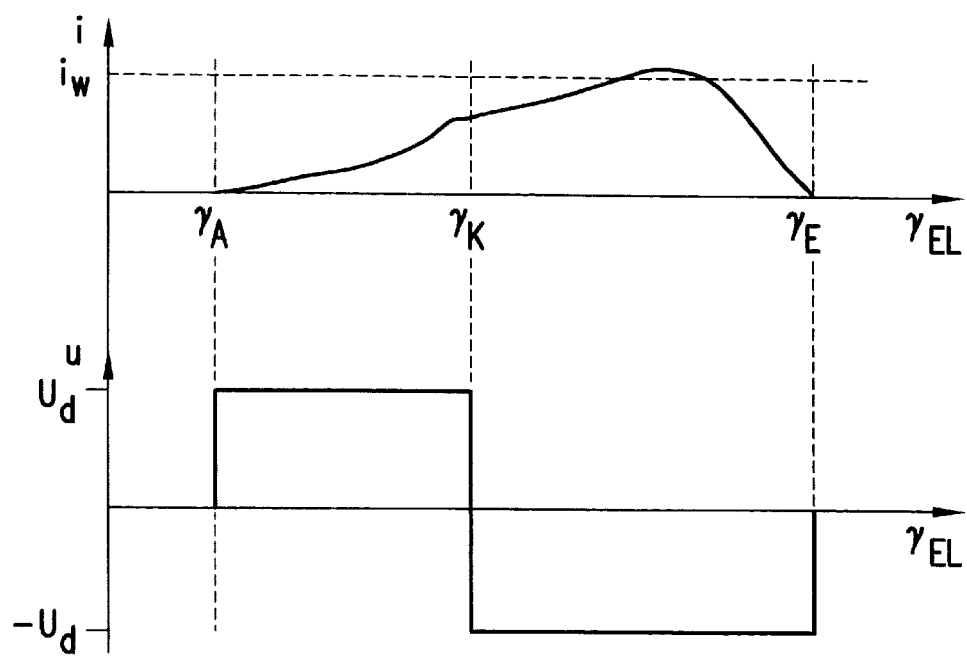
Figure 6:
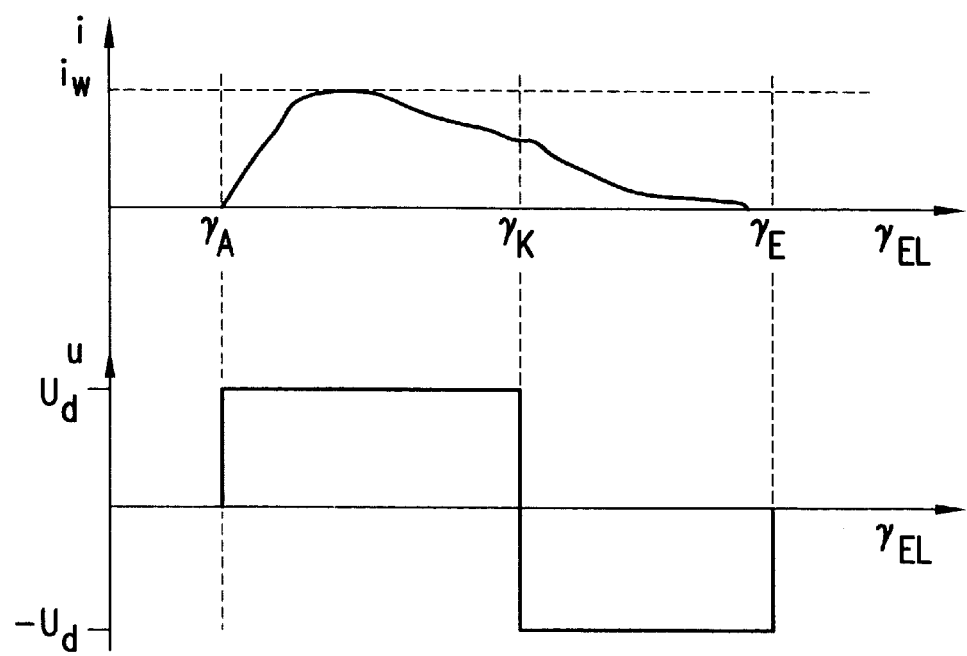
Figure 7:
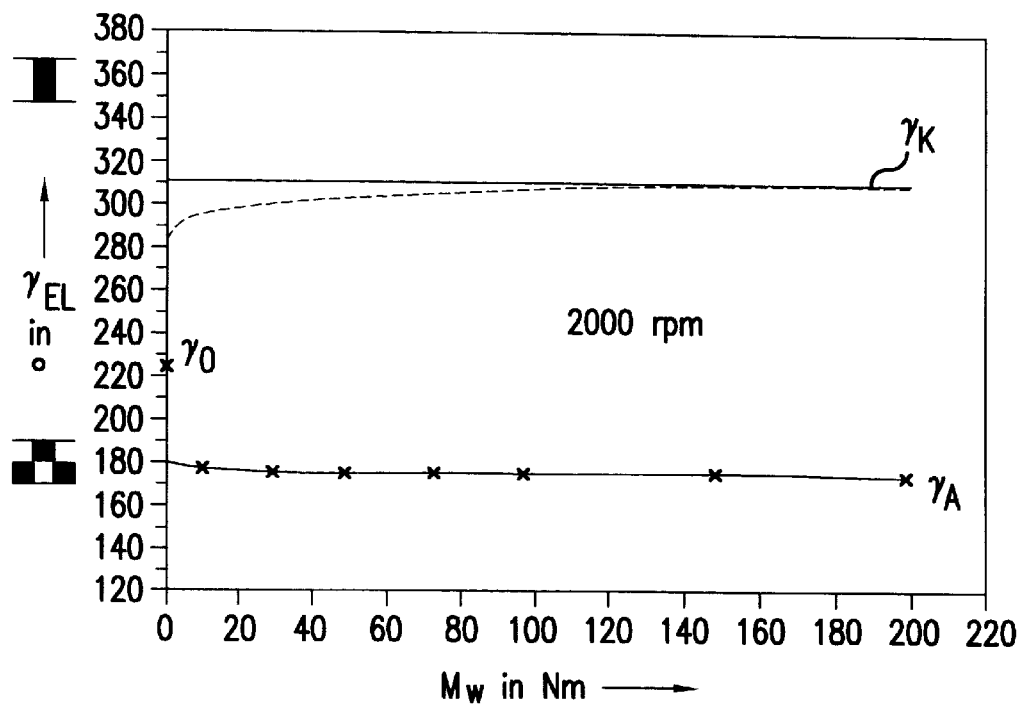
Figure 8:
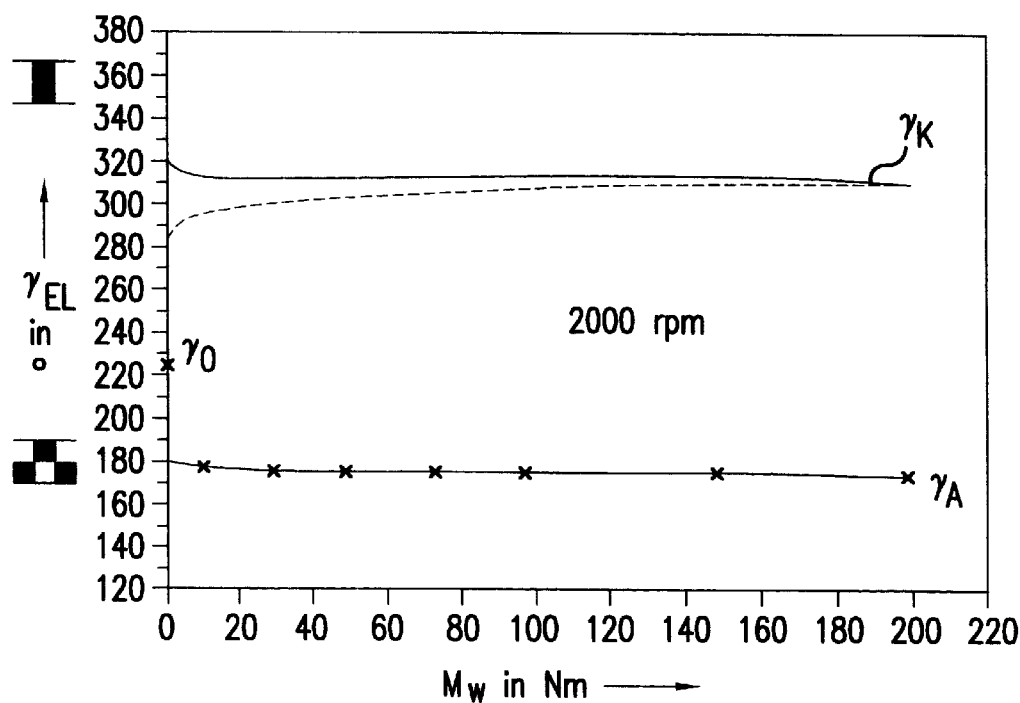

The invention will be described in more detail in the following text with reference to a drawing, in which FIG. 1 shows an outline illustration of a torque control system according to the invention, FIG. 2 shows the profile of a switch-on and commutation parabola plotted against the nominal torque value, FIG. 3 shows an outline illustration of a control system with analogue current regulation using the method according to the invention, FIG. 4 shows a flowchart of a main program and of a subroutine, FIG. 5 shows a basic profile of the current and voltage in generator operation, FIG. 6 shows a basic profile of the current and voltage in motor operation, FIG. 7 shows the profile of a commutation straight line, and FIG. 8 shows the profile of a commutation parabola.

The invention will be described in the following text with reference to a reluctance machine for providing traction in a motor vehicle, in which a linear accelerator pedal signal from the driver is used to control a highly nonlinear system. However, the invention is not limited to this field of use. The invention will also be explained with reference to a three-winding machine, but can be used for machines having any desired number of windings >2.

FIG. 1 shows a sketch of the method sequence according to the invention. A switched reluctance machine GRM is connected to a converter SR, which supplies the switched reluctance machine with electrical power by means of a conventional circuit, which is not illustrated in any more detail. Measurement detectors or sensors 6 can be arranged in the connecting lines between the converter and the reluctance machine. The converter SR is also connected to a DC voltage source Q via two lines, and this DC voltage source Q has a measurement detector or sensor 2. The instantaneous current value i in each winding is tapped off between the converter SR and the reluctance machine GRM via a measurement detector or sensor 3, and is used as the actual value by a current regulation device. The current regulation device ASR is preferably an analogue regulation device.

In a further preferred embodiment, the current is regulated in digital form, in particular using a so-called DSP (digital signal processor) standard module. Other control parameter input variables are the switch-on angle $\gamma_A$, the commutation angle $\gamma_K$ and the winding nominal current value $i_W$. These control parameters are passed on from a control unit ST, with the switching angles $\gamma_A$, $\gamma_K$, being passed to the converter SR, and the nominal current value being passed to the current regulation device ARS. The control unit ST itself receives, as an input parameter, a preset nominal value of the torque $M_W$ and the instantaneous value of the rotor position angle $\gamma$. The rotor position is tapped off from the reluctance machine GRM via a rotor position detector RG, and is passed to the control system ST. The preset nominal value of the torque $M_W$ is preferably produced by a linear accelerator pedal signal, with a motor vehicle driver requesting more or less torque by the position of the accelerator pedal. The driver may himself be regarded as an element in a control system, closing a control loop one of whose components is torque control.

The switching angles $\gamma_A$, $\gamma_K$ and winding nominal current value $i_W$ control parameters are calculated by means of control coefficients, which are preferably stored as tabular values in a memory medium. An advantageous grid interval for the coefficients is 1 value per 10 revolutions. These control coefficients are used by the torque controller to calculate the control parameters $\gamma_A$, $\gamma_K$, $i_W$ in real time during operation, and to preset these parameters for the converter SR and the current regulation device ASR. Since these control parameters are dependent not only on the required nominal torque $M_W$, but also on the rotation speed n of the reluctance machine GRM, the control system is to receive information about the instantaneous rate of change of rotor position, which is accessible via the rotor position detector RG.

The switch-on and commutation angle control parameters for each rotation speed n produce a parabola which is parallel to the torque axis and has an apex point $\gamma_O$. The profiles of the parabolic functions which describe the relationships between control coefficients and control parameters are represented by the following numerical equations, which are known per se:

$$\gamma_A(M_W,n)=\gamma_O+c_A M_W^{mA} \text{ where } \gamma_A, \gamma_O \text{ in } ° \text{ and } M_W^{mA} \text{ in Nm} \quad (1)$$

and $$\gamma_A(M_W,n)=\gamma_O+c_A M_W^{mK} \text{ where } \gamma_A, \gamma_O \text{ in } ° \text{ and } M_W^{mK} \text{ in Nm} \quad (2)$$

The control coefficients $c_K$, mK, $c_A$, mA are only functions of the rotation speed n.

Accordingly, each rotation speed n has an associated horizontal parabola as a function of the torque nominal value $M_W$, with the branch of the switch-on angles $\gamma_A$ being located under the branch of the commutation angles $\gamma_K$. FIG. 2 shows one example of such a parabola, for a rotation speed of n=2000 rpm. The apex point $\gamma_O$ lies on the angle axis $\gamma_{EL}$. The value $\gamma_{EL}=360°$ in this case corresponds to the so-called aligned position, in which a rotor tooth is opposite a reluctance machine stator tooth which has been excited by current, and in which the magnetic reluctance is minimal. The value $\gamma_{EL}=180°$ corresponds to the unaligned position, in which the centre of a rotor slot is precisely opposite a stator tooth which is excited by current.

The profiles of the individual switch-on and commutation parabolae can be approximated to using the least squares method. The approximated profiles are plotted in FIG. 2 using discretely calculated values $\gamma_A$ and $\gamma_K$. This provides a very good match. The control coefficients can be extracted from the profile, so that only the torque nominal value $M_W$, which is preferably predetermined by the position of the accelerator pedal, and the present rotation speed n, which is established by means of the rotor position detector RG, are required to calculate the switching angles $\gamma_K$ and $\gamma_A$.

The switch-on and commutation parabolae are shifted to lower angular values as the rotation speed n rises. The greater the rotation speed n and the greater the required nominal torque $M_W$, the earlier is a winding of the reluctance machine switched on or off.

For the nominal current value, whose profile can be determined numerically in the same way as the switch-on and commutation parabolae, the numerical equation becomes a root function as follows:

$$i_W(M_W,n)=p\ M_W+q\sqrt{M_W} \text{ where } i_W \text{ in A and } M_W \text{ in Nm} \quad (3)$$

The coefficients p and q are only functions of the rotation speed.

$\gamma_A$, $\gamma_K$ and $i_W$ are used as control parameters during pulsed operation, while $\gamma_A$, $\gamma_K$ are adequate as control parameters in block operation.

Thus, in this case as well, only the torque nominal value $M_W$ and the rotation speed n are required to calculate $i_W$. Via the nominal torque $M_W$, the nominal current value $i_W$ rises continuously with the rotation speed n.

It is advantageous to calculate nominal current values $i_W$ up to the maximum rotation speeds, even though these are not required in block operation. The advantage of this is that, when using a voltage source Q whose output voltage is particularly dependent on the load, as is the case, for example, when using fuel cells, it is possible to compensate for any voltage fluctuations from the source Q. The torque can be set independently of the instantaneous voltage value. The control coefficients are preferably calculated using a minimum, constant DC voltage $U_d$. If any voltage fluctuations occur, then this thus results in operation at variable overvoltage. Particularly in block operation, such changes affect a resultant winding current, and also the internal torque. It is also advantageous to operate with nominal current values $i_W$ which are somewhat greater than the peak winding current values calculated for the minimum, constant DC voltage $U_d$. This reduces an discrepancies in the mean internal torque of the reluctance machine. The nominal current values $i_W$, which are slightly greater than the peak values, limit the rising winding currents, and thus prevent them from rising in an uncontrolled manner, in the same way as corresponding rises in the winding torques and mean winding torque, as well.

FIG. 3 shows details of a control system with an analogue current regulation device, as can be used in an arrangement as shown in FIG. 1. The control algorithms which are used each have associated control program components. The control function can be implemented in a processor. The position of an accelerator pedal is used as a preset nominal value for the torque $M_W$. The torque demand is passed not only to the current control system, where it is used in the element R1 to calculate a nominal current value $i_W$, but also to the converter, where the switching angles $\gamma_K$, $\gamma_A$ are calculated in an element R2. The information about the instantaneous rotor position $\gamma$ of the reluctance machine GRM and its rate of change are obtained from the signals from the rotor position detector RG, and the rotation speed n is calculated from them in the element R3.

Together with the calculated value n, the control coefficients $\gamma_O$, $c_A$, mA $c_K$, mK, p and q are read from tables, which are preferably stored in memory media, and the switching angles $\gamma_A$, $\gamma_K$ and the nominal current value $i_W$ are calculated in accordance with the equations (1), (2), (3). The calculation is advantageously carried out in a subroutine of a main program, which in one preferred embodiment is implemented in a processor.

For the regulation process to have sufficient accuracy, it is necessary to assume an angle determination threshold value of at most 6° electrical. The maximum permissible mechanical angular error then results from any program delay times and/or from other machine parameters, in particular from the actual combination of the number of teeth in t he machine.

In one particularly preferred embodiment, the main program is implemented in a microcontroller system, which allows main program delay times of less than 5 $\mu$s, and subroutine delay times of less than 14 $\mu$s. If the main program and subroutine respectively achieve delay times of 4 and 13 $\mu$s, this respectively corresponds to a maximum electrical angular error of 1.7° and 5.6° for the main program and subroutine, respectively. These values are sufficiently accurate for torque control at a rotation speed of 9000 rpm and with a combination of the number of teeth of 12/8 (number of stator teeth/number of rotor teeth).

FIG. 4 shows the flow charts for a preferred main program and subroutine. The subroutine is activated only when changes occur in the rotation speed n and/or in the torque nominal value $M_W$. If no change has occurred, the rotor position $\gamma_{EL}$ is compared with the switch-on and commutation angle nominal value $\gamma_A$, $\gamma_K$ and appropriate windings in the reluctance machine GRM are switched, these being the windings A, B, C in a machine having three windings. The control system then jumps back to the start of the main program.

If changes are found in the rotation speed n and/or in the torque nominal value $M_W$, then a jump is made to the subroutine NEUPAR.

There, the control coefficient $c_A$, mA, $c_K$, mK, p, q and $\gamma_O$ are read from a table. $\gamma_A$, $\gamma_K$ and $i_W$ are then calculated. $i_W$ is then sent directly from the subroutine to the analogue current regulation device, and the calculated control angles are transferred for comparison with the rotor position, once the jump has been made back into the main program. Essentially, the main program calculates only the instantaneous rotor position $\gamma_{EL}$.

It is advantageous for the maximum commutation angle to be monitored, and, in particular, a maximum commutation angle of more than 370° is reliably prevented. Monitoring of the commutation angle is preferably implemented in the main program, and in a particularly preferable manner in that program part in which the electrical angle is compared with the switch-off and commutation angle.

The current regulation device SR preferably has an analogue two-point regulator with hysteresis-band adjustment. The analogue current regulation device preferably keeps the winding current i in the predetermined hysteresis band during pulsed operation by means of alternate clocking. The converter must be designed in a corresponding way to this such that all three switching states $U_d$, $-U_d$, 0 V can be assumed in each winding of the reluctance machine GRM independently of the others.

Since, in generator operation, the reluctance machine GRM increases the rotating element of the voltage of the machine as the rotation speed n rises, this voltage element increases the voltage available for the rise in current when switching on at $\gamma_A$. This is particularly true when the reluctance machine GRM is used for block operation. Beyond a certain rotation speed n, this back-e.m.f. is greater than the sum of the negative DC voltage and the resistive voltage drop, even after switching at $\gamma_K$. The winding current accordingly rises further, and sets itself without any constraints. The control variables are then reduced to the switching angles $\gamma_A$, $\gamma_K$, and the nominal winding current value $i_W$ is intrinsically no longer directly relevant.

FIG. 5 shows the basic profile of the winding current i and the voltage u plotted against the control parameters $\gamma_A$ and $\gamma_K$ during generator operation. The winding is switched on at $\gamma_A$ by applying a positive voltage, $U_d$. The winding current rises until the winding is switched off again at $\gamma_K$. However, as described above, the winding current is increased further due to the back-e.m.f., reaches a maximum and falls to zero at a final angle $\gamma_E$, which is greater than $\gamma_K$. This corresponds to a switching response like that in motor operation, in which the nominal current value $i_W$ no longer has a direct role as a control parameter.

However, in generator operation, it is possible to deal with the rising winding current by means of an appropriate nominal current value. In this case, the switching of the winding voltage from $U_d$ to $-U_d$ is governed by the nominal current value $i_W$ rather than by the commutation angle $\gamma_K$. The commutation angle $\gamma_K$ becomes less important, and it need only lie between the two intersections of the current curve with the straight line at $i_W$ parallel to the angle axis. This also ensures that, once the winding current i has decreased below the value of $i_W$, the analogue current regulating device does not set the winding voltage u to zero or change to pulsed operation.

In comparison with conventional switching off at $\gamma_K$, this switching method has the advantage that it always operates more exactly as the rotation speed n increases. This is because, as the rotation speed n increases, the switch-on angle $\gamma_A$ is moved ever further into the motor operation region between the unaligned position and the aligned position. In this region, the change in the winding inductance $L(\gamma)$ with the angle $\gamma$ is still positive, and the linear winding inductance $L(\gamma)$ is a maximum in this region. The winding current i accordingly rises ever more slowly as the rotation speed n increases, as a result of which the switching process from $+U_d$ to $-U_d$ at relatively high rotation speeds n can take place exactly at the value predetermined by $i_W$ while, at the same time, the angular error resulting from the delay times in the control program becomes ever greater as the rotation speed increases, and the switching accuracy resulting from the commutation angle $\gamma_K$ becomes correspondingly less accurate.

The accuracy of torque control during generator operation can be improved further over that with the conventional method by means of this measure. Furthermore, this allows real-time calculation of the commutation angle $\gamma_K$ to be simplified.

The calculation of the commutation angle $\gamma_K$ can be simplified, and the numerical equation of the corresponding parabola branch becomes a straight line. The commutation angle $\gamma_K$ is now given by:

$$\gamma_K(n)=\gamma_{OG}(n)+c_{KG}(n) \text{ where } \gamma_{OG} \text{ and } \gamma_K \text{ in } ° \quad (4)$$

where the index G represents generator operation. $\gamma_{OG}$ is preferably chosen in this way. The constant $c_{KG}$ may be chosen to be a function of the rotation speed, or else may be chosen to be a constant which is independent of the rotation speed. Now, the commutation angle $\gamma_K$ is only a function of the rotation speed n, and is independent of the torque nominal value $M_W$. As the rotation speed rises and the nominal torque becomes greater, the position of the switch-on angles $\gamma_A$ is moved towards smaller angular values, and the straight lines for the commutation angle $\gamma_K$ are likewise shifted towards smaller angles, independently of the torque nominal value $M_W$, as the rotation speed rises.

The reduction in the dependency of the commutation angle on the rotation speed advantageously simplifies the real-time calculation in the control program, and likewise reduces the memory space required for the control coefficients.

In contrast to the situation when the reluctance machine GRM is being operated as a generator, this analysis does not apply to motor operation since the nominal current value $i_W$ is no longer reached before the winding is switched off during motor operation. This is illustrated in FIG. 6.

The winding is switched on at $\gamma_A$, and is switched off at $\gamma_K$. In between, the winding current i rises, without reaching the nominal value $i_W$. This is because the rotating element of the voltage increases as the rotation speed n increases. This rotating element reduces the voltage available for the current rise to such an extent that $i_W$ can no longer be reached. The winding current profile then sets itself virtually without any constraints below $i_W$, and the control parameters are reduced to the switching angles $\gamma_A$, $\gamma_K$.

Despite this, it is evident that, even during motor operation with the method according to the invention, the upper branch of the switch-on and commutation parabolae can advantageously be replaced, as in generator operation, by a straight line having a commutation angle which is constant for a given rotation speed n. This leads to a further advantageous reduction in program delay times and memory space occupancy, since there is no need for any comprehensive tables for commutation angles. The commutation angle during motor operation is then determined from the equation, $$\gamma_K(n)=\gamma_{OM}(n)+c_{KM}(n) \text{ where } \gamma_{OM} \text{ and } \gamma_K \text{ in } ° \quad (5).$$

At low torque values M and when using the method according to the invention, the winding is accordingly switched off at greater commutation angles $\gamma_K$ than when using control parameters based on the switch-on and commutation parabolae. $c_{KM}(n)$ may be chosen both as a parameter which is independent of the rotation speed and as a parameter which is dependent on the rotation speed. $c_{KM}(n)$ is preferably equal to the maximum commutation angle minus $\gamma_{OM}(n)$ for the maximum torque nominal value $M_W^{max}$ of the switch-on and commutation paralolae corresponding to the present conditions.

FIG. 7 shows the profile of a commutation straight line as a function of the torque nominal value for a rotation speed of 2000 rpm. The profile of the corresponding upper branch of the switch-on and commutation parabola is shown by a dashed line.

For simplicity, the peak values of the switch-on and commutation parabola can also be determined such that a single peak value occurs during both motor and generator operation, and $\gamma_O(n)=\gamma_{OM}(n)=\gamma_{OG}(n)$. However, different parabola peak values may also be used for motor operation and generator operation.

In one particularly advantageous development of the invention, the lower branch of the switch-on and commutation parabola can be used instead of a commutation straight line. The commutation angle is then given by:

$$\gamma_K(M_W,n)=c_1(n)+\gamma_A(M_W,n) \text{ where } \gamma_A,\gamma_K, c_1 \text{ in } ° \text{ and } M_W \text{ in Nm} \quad (6)$$

The parameter $c_1(n)$ may be dependent on the rotation speed, but may also be chosen to be a constant which is independent of the rotation speed. The addition of $c_1(n)$ preferably corresponds to the maximum commutation angle for the maximum torque nominal value $M_W$ of the switch-on and commutation parabola which corresponds to the present conditions. Although the commutation angle $\gamma_K$ is now once again dependent on the torque, since in this case the switch-on angle $\gamma_A(M_W,n)$ must be calculated in accordance with the parabola profile, no additional computation complexity is involved, apart from a simple addition, however, in order to determine the values for $\gamma_K$. The profile of $\gamma_K(M_W,n)$ is then shifted parallel to the switch-on branch $\gamma_A(M_W,n)$ of the switch-on commutation parabola, through the maximum commutation angle for the maximum torque. This profile is illustrated in FIG. 8. The profile of the conventional commutation parabola branch is shown by a dashed line.

Since, at low torques M, a winding is not switched off until the commutation angles $\gamma_K$ become even greater than when using one of the switched-on and commutation parabolas known from the prior art or when using a commutation straight line $\gamma_K(n)$ according to the invention, this results in a further advantageous increase in the utilization of the torque profile of the reluctance machine GRM.

At least during motor operation or during generator operation, it is advantageous to use at least one commutation straight line or one commutation parabola branch according to the invention for determining the switch-on and/or commutation angle. It is particularly advantageous to determine the switch-on and commutation angle from a commutation straight line and/or a commutation parabola branch according to the invention, both in motor operation and in generator operation.

What is claimed is:

1. A method for controlling a switched reluctance motor by means of a torque controller with motor operation and generator operation operating ranges, in which motor windings are switched on as a function of the rotor angular position ($\gamma_{EL}$) at a switch-on angle ($\gamma_A(M_W,n)$) and are switched off at a commutation angle ($\gamma_K(M_W,n)$) with the angles being determined as control parameters ($i_W$, $\gamma_A(M_W,n)$) ($\gamma_K(M_W,n)$) as a function of the rotation speed (n) from stored control coefficients ($\gamma_O$, $c_A$, $m_A$, $c_K$, $c_{AG}$, $c_{KG}$, $m_{AG}$, p, q) which are read during operation of the reluctance motor, wherein, during generator operation, the commutation angle ($\gamma_K$) for any rotation speed (n) increases, starting from a maximum value ($c_1$) at a maximum torque ($M_{W,max}$) as the torque values ($M_W$) decrease, and in that, subsequently, a winding current preset nominal value ($i_W$), which is calculated as a control parameter for the windings of the reluctance motor is sent to a current regulation device.

2. The method according to claim 1,
wherein, during motor operation, the commutation angle ($\gamma_K$) for each rotation speed (n) remains constant, starting from a maximum value ($c_1$) at a maximum torque ($M_{W,max}$) as the torque values ($M_W$) decrease.

3. The method according to claim 1,
wherein, motor operation, the commutation angle ($\gamma_K$) for each rotation speed (n) increases, starting from a maximum value ($c_1$) at a maximum torque ($M_{W,max}$) as the torque values ($M_W$) decrease.

4. Method according to claim 1,
wherein the commutation angle ($\gamma_K$) is formed in accordance with the relationship $\gamma_K(n)=c_1+\gamma_A(n)$, with $\gamma_A(n)$ describing the path of the switch-on parabola as a function of the torque ($M_W$) and the addition of $C_1(n)$ giving the maximum commutation angle ($\gamma_K$) for a given rotation speed (n) at the maximum torque ($M_W$).

5. Method according to claim 1,
wherein the commutation angle ($\gamma_K$) is monitored so that a maximum commutation angle ($\gamma_K$) is not exceeded.

6. Method according to claim 1
wherein the commutation angle ($\gamma_K$) is monitored by a control program.

7. Method according to claim 1,
wherein the commutation angle ($\gamma_K$) is monitored so that a maximum commutation angle ($\gamma_K$) is not exceeded.

8. A method for controlling a switched reluctance motor by means of a torque controller with motor operation and generator operation operating ranges, in which motor windings are switched on as a function of the rotor angular position ($\gamma_{EL}$) at a switch-on angle ($\gamma_A(M_W,n)$) and are switched off at a commutation angle ($\gamma_K(M_W,n)$), with the angles being determined as control parameters ($i_W$, $\gamma_A$, $\gamma_K$), as a function of the rotation speed (n) from stored control coefficients ($\gamma_O$, $c_A$, $m_A$, $c_K$, $c_{AG}$, $c_{KG}$, $m_{AG}$, p, q) which are read during operation of the reluctance motor, wherein:

at least during in motor operation, the commutation angle ($\gamma_K$) for each rotation speed (n) at least remains constant or increases, starting from a maximum value ($c_1$) at a maximum torque ($M_{W,max}$) as the torque values ($M_W$) decrease, and in that, subsequently, a winding current preset nominal value ($i_W$), which is calculated as a control parameter, for the windings (A, B, C) of the reluctance motor is sent to a current regulation device.

9. The method according to claim 8,
wherein, during generator operation, the commutation angle ($\gamma_K$) for each rotation speed (n) remains constant, starting from a maximum value ($c_1$) at a maximum torque ($M_{W,max}$) as the torque values ($M_W$) decrease.

10. The method according to claim 8,
wherein, during generator operation, the commutation angle ($\gamma_K$) for each rotation speed (n) increases, starting from a maximum value ($c_1$) at a maximum torque ($M_{W,max}$), as the torque value ($M_W$) decrease.

11. Method according to claim 8,
wherein the commutation angle ($\gamma_K$) is selected in accordance with the relationship $\gamma_K(n)=c_1(n)$, with $c_1(n)$ being the maximum commutation angle ($\gamma_K$) at a given rotation speed (n) for the maximum torque ($M_W$).

12. Method according to claim 8,
wherein the commutation angle ($\gamma_K$) is formed in accordance with the relationship $\gamma_K(n)=C_1+\gamma_A(n)$, with $\gamma_A(n)$ describing the path of the switch-on parabola as a function of the torque ($M_W$) and the addition of $C_1(n)$ giving the maximum commutation angle ($\gamma_K$) for a given rotation speed (n) at the maximum torque ($M_W$).

13. A method for controlling a switched reluctance motor using a torque controller having motor operation and generator operation operating ranges, comprising the steps of:

determining switch on angles and commutation angles as a function of rotation speed based on stored control coefficients read out during operation of the reluctance motor;

switching on motor windings as a function of rotor angular position at said determined switch on angle;

switching off said motor windings at said commutation angle wherein, during generator operation, the commutation angle for any rotation speed increases, starting from a predetermined maximum value at a predetermined maximum torque, during decrease in the torque values; and wherein a winding current preset nominal value calculated as a control parameter for the windings of the reluctance motor is provided to a current regulation device.

14. A method for controlling a switched reluctance motor using a torque controller having motor operation and generator operation operating ranges, comprising the steps of:

determining switch on angles and commutation angles as a function of rotation speed based on stored control coefficients read out during operation of the reluctance motor;

switching on motor windings as a function of rotor angular position at said determined switch on angle;

switching off said motor windings at said commutation angle wherein, at least during motor operation, the commutation angle for each rotation speed either remains constant or increases starting from a maximum predetermined value at a maximum predetermined torque as the torque values decrease and wherein a winding current preset nominal value, which is calculated as a control parameter for the windings of the reluctance motor is provided to a current regulation device.

* * * * *